US010261799B2

(12) United States Patent
Ingram et al.

(10) Patent No.: US 10,261,799 B2
(45) Date of Patent: Apr. 16, 2019

(54) PROGRAMMATIC IMPLICIT MULTITHREADING

(71) Applicant: International Business Machines Corporation, Armonk, NY (US)

(72) Inventors: Samuel K. Ingram, Fulshear, TX (US); Sergio Reyes, Austin, TX (US); Brian C. Twichell, Austin, TX (US); Yijie Zhang, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 15/444,881

(22) Filed: Feb. 28, 2017

(65) Prior Publication Data

US 2018/0246726 A1    Aug. 30, 2018

(51) Int. Cl.
*G06F 9/46* (2006.01)
*G06F 9/38* (2018.01)
*G06F 9/30* (2018.01)

(52) U.S. Cl.
CPC .......... *G06F 9/3885* (2013.01); *G06F 9/3009* (2013.01); *G06F 9/30145* (2013.01)

(58) Field of Classification Search
CPC .... G06F 9/4881; G06F 9/4806; G06F 9/4843; G06F 9/4887; G06F 9/5066; G06F 9/548
See application file for complete search history.

(56) References Cited

U.S. PATENT DOCUMENTS

| | | | |
|---|---|---|---|
| 6,434,590 B1 * | 8/2002 | Blelloch | G06F 9/5066 718/102 |
| 8,656,145 B2 | 2/2014 | Plondke et al. | |
| 8,812,936 B2 | 8/2014 | Blaunstein | |
| 9,703,594 B1 * | 7/2017 | Kamboj | G06F 9/4806 |
| 2005/0081216 A1 * | 4/2005 | Taylor | G06F 9/548 719/315 |
| 2014/0040262 A1 * | 2/2014 | Winter | G06F 17/30778 707/737 |
| 2014/0181484 A1 | 6/2014 | Callister et al. | |
| 2014/0317629 A1 * | 10/2014 | Stanfill | G06F 9/4843 718/102 |
| 2015/0121396 A1 | 4/2015 | Martinez Canedo et al. | |
| 2015/0277922 A1 | 10/2015 | Bartik et al. | |
| 2015/0277923 A1 | 10/2015 | Bradbury et al. | |

\* cited by examiner

*Primary Examiner* — Dong U Kim
(74) *Attorney, Agent, or Firm* — Francis Lammes; Stephen J. Walder, Jr.; Wenjie Li

(57) ABSTRACT

A mechanism is provided for programmatic implicit multithreading. A first operation is executed on a first thread in a processor, where the first operation is from a set of operations within a block of code of an application that are distinct and process unrelated data. A determination is made as to whether a time limit associated with executing the first operation has been exceeded. Responsive to the time limit being exceeded, a determination is made as to whether there is one or more unexecuted operations in the set of operations. Responsive to one or more unexecuted operations existing in the set of operations, a new thread is spawned off on the processor to execute a next unexecuted operation of the one or more unexecuted operations.

15 Claims, 3 Drawing Sheets

PROGRAMMATIC IMPLICIT MULTITHREADING

BACKGROUND

The present application relates generally to an improved data processing apparatus and method and more specifically to mechanisms for programmatic implicit multithreading.

In computer architecture, multithreading is the ability of a central processing unit (CPU) or a single core in a multi-core processor to execute multiple processes or threads concurrently, appropriately supported by the operating system. Multithreading differs from multiprocessing, as with multithreading the processes and threads share the resources of a single or multiple cores: the computing units, the CPU caches, and the translation lookaside buffer (TLB), whereas, on the other hand, multiprocessing systems include multiple complete processing units. Multithreading aims to increase utilization of a single core by using thread-level as well as instruction-level parallelism. As the two techniques are complementary, they are sometimes combined in systems with multiple multithreading CPUs and in CPUs with multiple multithreading cores.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for programmatic implicit multithreading. The illustrative embodiment executes a first operation on a first thread in the processor, wherein the first operation is from a set of operations within a block of code of an application that are distinct and process unrelated data. The illustrative embodiment determines whether a time limit associated with executing the first operation has been exceeded. The illustrative embodiment determines whether there is one or more unexecuted operations in the set of operations in response to the time limit being exceeded. The illustrative embodiment spawns off a new thread on the processor to execute a next unexecuted operation of the one or more unexecuted operations in response to one or more unexecuted operations existing in the set of operations.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
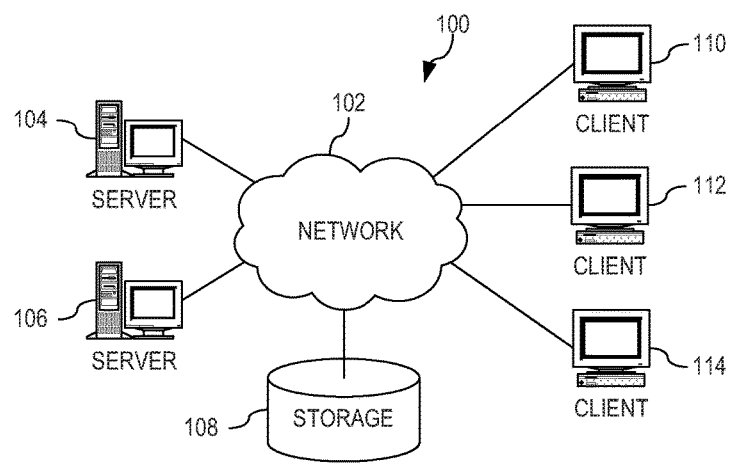
FIG. 1 is an example diagram of a distributed data processing system in which aspects of the illustrative embodiments may be implemented.

The illustrative embodiments provide mechanisms for programmatic implicit multithreading. As noted above, an operating system (OS) has the ability to maximize the use of a data processing system's resources, such as a central processing unit (CPU) or a single core in a multi-core processor, by dispatching runnable application processes when the OS detects that the current running application will experience a delay waiting for a disk or network input/output (I/O) operation. Typically, the application requesting the I/O operation will be put to sleep, thus ceding access to the CPU or the single core in the multi-core processor to these runnable applications, becoming runnable only when the I/O operation has been completed.

The ceding of to the CPU or the single core in the multi-core processor by an application during an I/O operation improves overall CPU or core usage efficiency when accessing a network and/or a disk. However, the behavior is not extended to include memory accesses. Memory accesses are excluded because memory accesses typically occur in the magnitude of microseconds, which is a fast enough response time to not require streamlining. Although, with the advent of technologies such as shared virtual memory via a hypervisor and non-volatile Dual In-line Memory Module memory (NV-DIMM), accesses times to memory may take milliseconds, which could be as long as or longer than an I/O operation access times. Because applications do not sleep and cede the processor on memory accesses, slow memory access times may impact CPU or core usage efficiency worse than disk or network I/O operations, by having idle applications blocking usage of a CPU or core resource.

Therefore, the illustrative embodiments provide programmatic implicit multithreading mechanisms that, upon detecting response delays, maximize the performance of an application by automatically issuing more work in parallel. The programmatic implicit multithreading mechanisms allows programmers to specify a unit of time for an operation and, once exceeded, the application will issue the operation in the background thereby continuing with the application's next set of programmatic instructions. Thus, the programmatic implicit multithreading mechanisms implicitly allow applications to run in a multithreaded manner initiated by an operation's latency performance.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
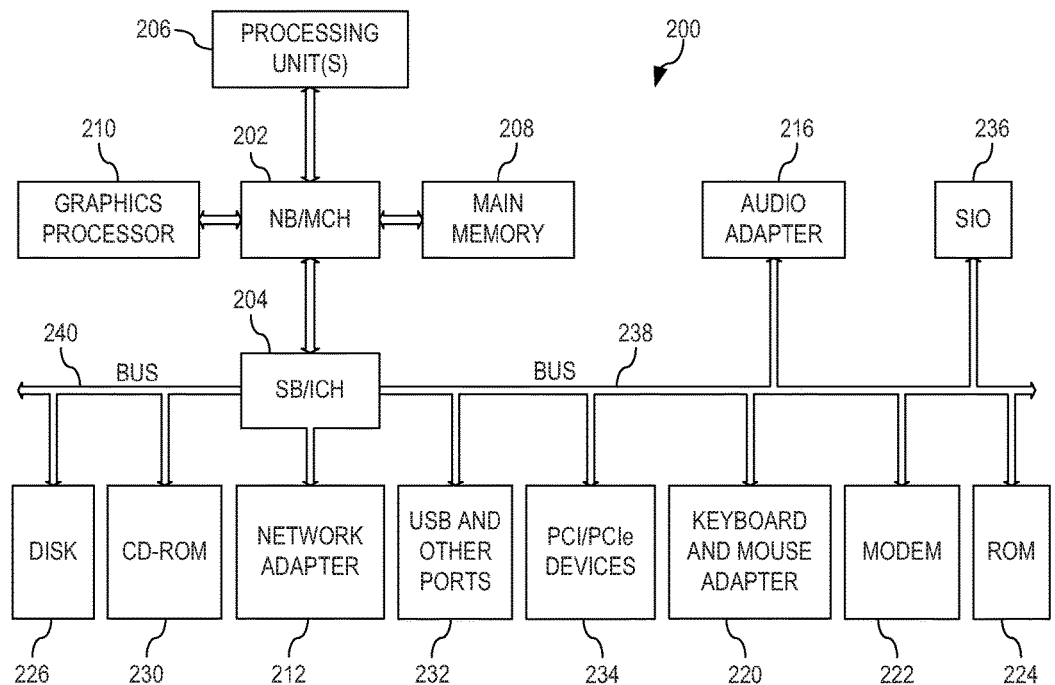
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 and or clients 110, 112, and 114, may be specifically configured to implement programmatic implicit multithreading mechanisms. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates programmatic implicit multithreading.

As noted above, the mechanisms of the illustrative embodiments utilize specifically configured computing devices, or data processing systems, to perform the operations for programmatic implicit multithreading. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to programmatic implicit multithreading mechanisms.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
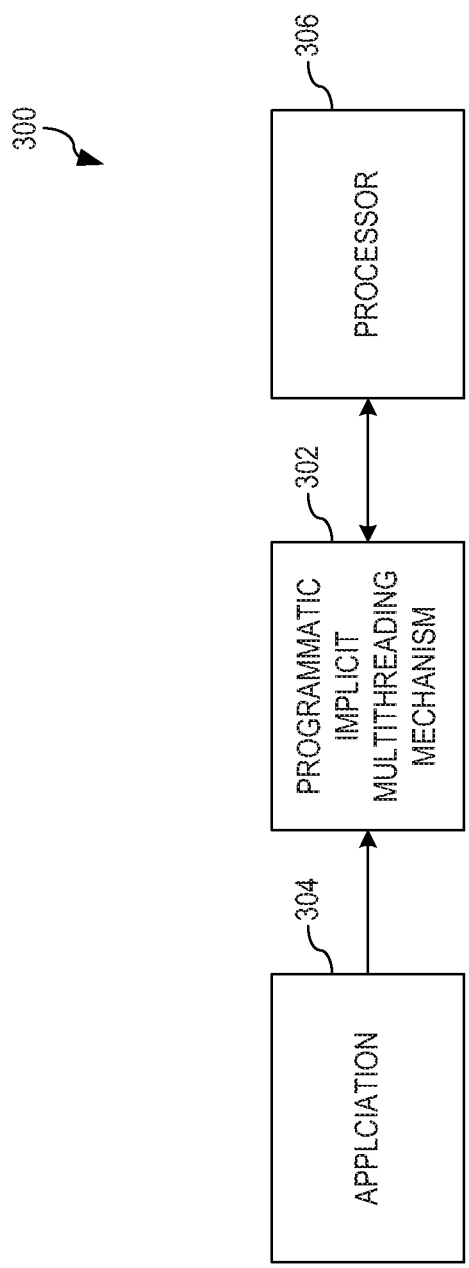
FIG. 3 depicts an exemplary functional block diagram of a programmatic implicit multithreading mechanism operating within a data processing system in accordance with an illustrative embodiment.

FIG. 3 depicts an exemplary functional block diagram of a programmatic implicit multithreading mechanism operating within a data processing system in accordance with an illustrative embodiment. Data processing system 300 comprises programmatic implicit multithreading mechanism 302 that is implemented collaboratively through and operating system, compiler, interpreter, or the like, of data processing system 300. Prior to one or more operations from a block of code within application 304 being executed by processor 306, programmatic implicit multithreading mechanism 302 identifies whether a developer of application 304 has identified a set of operations within the block of code of application 304 that are distinct and process unrelated data, thus capable of being executed in parallel. If programmatic implicit multithreading mechanism 302 identifies a set of operations that are distinct and process unrelated data within the block of code of application 304, programmatic implicit multithreading mechanism 302 determines whether the developer has specified within the block of code of application 304 a predetermined time limit upon which, when the predetermined time limit has been exceeded, will trigger parallelization of operations within the set of operations that are distinct and process unrelated data.

If programmatic implicit multithreading mechanism 302 identifies a predetermined time limit for use in triggering parallelization of operations within the set of operations that are distinct and process unrelated data, programmatic implicit multithreading mechanism 302 uses the predetermined time limit as the trigger in spawning off new threads when a current operation has a latency that exceeds the predetermined time limit. However, if programmatic implicit multithreading mechanism 302 fails to identify a developer specified predetermined time limit, programmatic implicit multithreading mechanism 302 may utilize a default time limit when a set of operations that are distinct and process unrelated data exist within the block of code of application 304.

Once a first operation within the block of code of application 304 is executed by processor 306, programmatic implicit multithreading mechanism 302 determines whether the time limit, either the predetermined time limit or the default time limit depending on which one is being used by programmatic implicit multithreading mechanism 302, has been exceeded. If programmatic implicit multithreading mechanism 302 determines that the time limit has not been exceeded, then programmatic implicit multithreading mechanism 302 determines whether the operation has completed. If programmatic implicit multithreading mechanism 302 determines that the operation has not completed, then programmatic implicit multithreading mechanism 302 continues to monitor the operation for exceeding the time limit and completion. If programmatic implicit multithreading mechanism 302 determines that the operation has completed, then the next operation within the block of code of application 304 is executed by processor 306.

In the event that programmatic implicit multithreading mechanism 302 determines that the time limit has been exceeded, then programmatic implicit multithreading mechanism 302 determines whether there is another unexecuted operation in the set of operations that are distinct and process unrelated data within the block of code of application 304. If programmatic implicit multithreading mechanism 302 determines that there is not another unexecuted operation in the set of operations that are distinct and process unrelated data within the block of code of application 304, then programmatic implicit multithreading mechanism 302 monitors the current operation as well as other executing operations within the block of code of application 304 for completion.

If programmatic implicit multithreading mechanism 302 determines that there is another unexecuted operation in the set of operations that are distinct and process unrelated data within the block of code of application 304, programmatic implicit multithreading mechanism 302 spawns off a thread to handle the next unexecuted operation in the set of operations that are distinct and process unrelated data within the block of code of application 304, with a same process to that of the first operation previously discussed being performed for the next operation. That is, for each operation that is spawned off to a new thread, the same process to that described with regard to the first operation is performed. Each time a time limit associated with a current operation is exceeded, programmatic implicit multithreading mechanism 302 spawns off a new thread to handle a next unexecuted operation in the set of operations that are distinct and process unrelated data within the block of code of application 304 (if present), up to the number of threads that are able to be executed at once by processor 306. Each time one operation in the set of operations that are distinct and process unrelated data within the block of code of application 304 completes and another operation is being executed in another thread, programmatic implicit multithreading mechanism 302 may close the thread for executing a next unexecuted operation. Once programmatic implicit multithreading mechanism 302 determines that all operations within the block of code of application 304 currently being executed by processor 306 are complete, the programmatic implicit multithreading mechanism 302 rejoins a parent thread of application 304 and the process is repeated for any next block of code in application 304 the process ends.

The following is an exemplary block of code in an application that provides for programmatic implicit multithreading.

for (i=0; i<arraySize; i++) {
//& specifies that the operation has a timelimit.//if time to execute is >1 ms, place in background
A[i]=B[i]; & #pragma maxOpLatency=1.0;
//next set of instructions
A[i]=A[i]+1;
}//waits_for_all_implicitly-created threads to rejoin primary thread In this example, the ampersand (&) denotes a statement that may be implicitly multi-threaded. The pragma denotes that the maximum latency before spawning off a new thread is one millisecond. In this example, the end of the block (i.e. the end of the 'for' loop) is the point where programmatic implicit multithreading mechanism 302 waits for all implicitly-created threads to rejoin the primary thread. Therefore, this exemplary code demonstrates a loop where each assignment from array B to array A must complete within the exemplary one millisecond, otherwise a thread is implicitly spawned and the current operation is placed in the background, and the process of execution continues.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
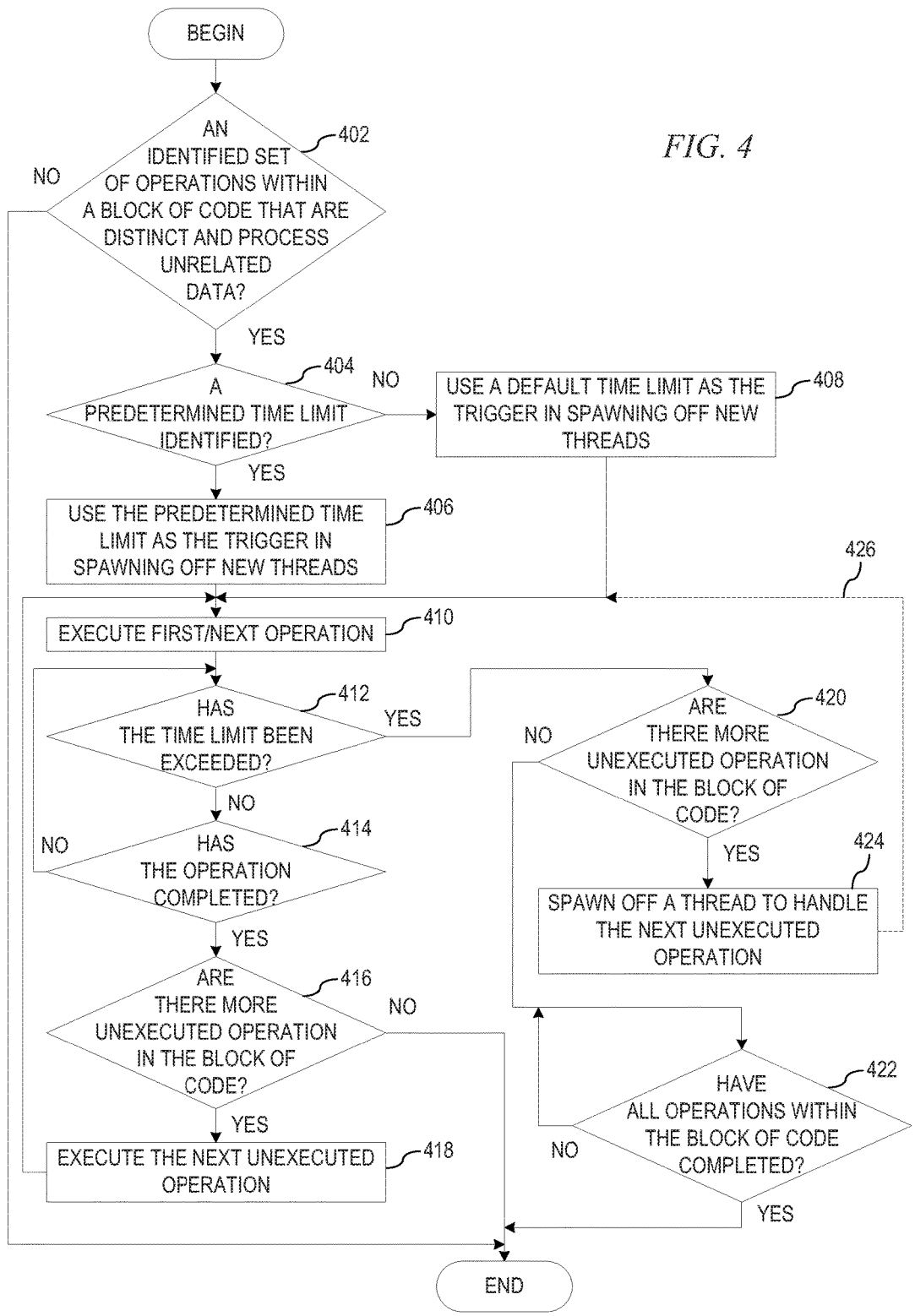
FIG. 4 depicts an exemplary flowchart of the operation performed by a programmatic implicit multithreading mechanism operating within a data processing system in accordance with an illustrative embodiment.

FIG. 4 depicts an exemplary flowchart of the operation performed by a programmatic implicit multithreading mechanism operating within a data processing system in accordance with an illustrative embodiment. As the operation begins, the programmatic implicit multithreading mechanism identifies whether an application has identified a set of operations within a block of code of the application that are distinct and process unrelated data, thus capable of being executed in parallel (step 402). If at step 402 the programmatic implicit multithreading mechanism fails to identify a set of operations within a block of code of the application that are distinct and process unrelated data, the operation terminates. However, if at step 402 the programmatic implicit multithreading mechanism identifies a set of operations within a block of code of the application that are distinct and process unrelated data, the programmatic implicit multithreading mechanism determines whether predetermined time limit upon which, when the predetermined time limit has been exceeded, will trigger parallelization of operations within the set of operations that are distinct and process unrelated data has been identified within the block of code of the application (step 404).

If at step 404 the programmatic implicit multithreading mechanism identifies a predetermined time limit for use in triggering parallelization of operations within the set of operations that are distinct and process unrelated data, the programmatic implicit multithreading mechanism uses the predetermined time limit as the trigger in spawning off new threads when a current operation has a latency that exceeds the predetermined time limit (step 406). However, if at step 404 the programmatic implicit multithreading mechanism fails to identify a developer specified predetermined time limit, the programmatic implicit multithreading mechanism utilizes a default time limit when a set of operations that are distinct and process unrelated data exist within the block of code of the application (step 408).

From step 406 or 408, a first operation within the block of code of application is executed by a processor (step 410). The programmatic implicit multithreading mechanism determines whether the time limit, either the predetermined time limit or the default time limit depending on which one is being used by the programmatic implicit multithreading mechanism, has been exceeded (step 412). If at step 412 the programmatic implicit multithreading mechanism determines that the time limit has not been exceeded, then the programmatic implicit multithreading mechanism determines whether the operation has completed (step 414). If at step 414 the programmatic implicit multithreading mechanism determines that the operation has not completed, then the operation returns to step 412. If at step 414 the programmatic implicit multithreading mechanism determines that the operation has completed, then the programmatic implicit multithreading mechanism determines whether there is one or more unexecuted operations in the set of operations that are distinct and process unrelated data exist within the block of code of the application (step 416).

If at step 416 the programmatic implicit multithreading mechanism determines that there are no more unexecuted operations in the set of operations that are distinct and process unrelated data exist within the block of code of the application, the operation terminates. If at step 416 the programmatic implicit multithreading mechanism determines that there are one or more unexecuted operations in the set of operations that are distinct and process unrelated data exist within the block of code of the application, the programmatic implicit multithreading mechanism executes the next unexecuted operation in the set of operations within a block of code of the application that are distinct and process unrelated data (step 418), with the operation returning to step 412 thereafter.

If at step 412 the programmatic implicit multithreading mechanism determines that the time limit has been exceeded, the programmatic implicit multithreading mechanism determines whether there is another unexecuted operation in the set of operations that are distinct and process unrelated data within the block of code of application (step 420). If at step 420 the programmatic implicit multithreading mechanism determines that there is not another unexecuted operation in the set of operations that are distinct and process unrelated data within the block of code of the application, the programmatic implicit multithreading mechanism monitors the current operation as well as other executing operations, if any, within the block of code of the application for completion (step 422). If at step 422 the programmatic implicit multithreading mechanism determines that not all of the executing operations within the block of code of the application have completed, then the operation returns to step 422. If at step 422 the programmatic implicit multithreading mechanism determines that all the executing operations within the block of code of the application have completed, the operation terminates.

If at step 420 the programmatic implicit multithreading mechanism determines that there is another unexecuted operation in the set of operations that are distinct and process unrelated data within the block of code of the application, the programmatic implicit multithreading mechanism spawns off a thread to handle the next unexecuted operation in the set of operations that are distinct and process unrelated data within the block of code of the application (step 424), with a same process to that of the first operation previously discussed being performed for the next operation. That is, for each operation that is spawned off to a new thread, the same process to that described with regard to the first operation is performed. Thus, the process in essence is repeated for each operation spawned to a new thread as is indicated by the dashed line 426, where the operation for that operation begins at step 410. Each time a time limit associated with a current operation is exceeded, the programmatic implicit multithreading mechanism spawns off a new thread to handle a next unexecuted operation in the set of operations that are distinct and process unrelated data within the block of code of the application, up to the number of threads that are able to be executed at once by the processor. Once the programmatic implicit multithreading mechanism determines that all operations within the block of code of the application currently being executed by the processor are complete at step 422, the programmatic implicit multithreading mechanism rejoins a parent thread of the application and the operation terminates.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for programmatic implicit multithreading. Upon detecting response delays, performance of an application is maximized by automatically issuing more work in parallel. A programmatic implicit multithreading mechanisms allows programmers to specify a unit of time for an operation and, once exceeded, the application will issue the operation in the background thereby continuing with the application's next set of programmatic instructions. Thus, the programmatic implicit multithreading mechanisms implicitly allow applications to run in a multithreaded manner initiated by an operation's latency performance.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory coupled to the processor, for programmatic implicit multithreading, the method comprising:
    executing a first operation on a first thread in the processor, wherein the first operation is from a set of operations within a block of code of an application that are distinct and process unrelated data;
    determining whether a time limit associated with executing the first operation has been exceeded, wherein the time limit is a default time limit that triggers parallelization of operations within the block of code of the application that are distinct and process unrelated data when the default time limit has been exceeded and wherein the default time limit is used when a predetermined time limit fails to be identified within the block of code of the application;
    responsive to the time limit being exceeded, determining whether there is one or more unexecuted operations in the set of operations; and
    responsive to one or more unexecuted operations existing in the set of operations, spawning off a new thread on the processor to execute a next unexecuted operation of the one or more unexecuted operations.

2. The method of claim 1, further comprising:
    responsive to the time limit failing to be exceeded, determining whether the first operation has completed;
    responsive to the first operation completing before the time limit is exceeded, determining whether there is one or more unexecuted operations in the set of operations; and
    responsive to one or more unexecuted operations existing in the set of operations, executing the next unexecuted operation of the one or more unexecuted operations.

3. The method of claim 1, further comprising:
    for each unexecuted operation in the one or more unexecuted operations spawned off to a new associated thread due to a previous operation exceeding the time limit:
    executing the unexecuted operation on the new associated thread in the processor thereby forming a executing operation;
    determining whether a time limit associated with the executing operation has been exceeded;
    responsive to the time limit being exceeded, determining whether there is one or more unexecuted operations in the set of operations; and
    responsive to one or more unexecuted operations existing in the set of operations, spawning off an associated thread on the processor to execute the next unexecuted operation of the one or more unexecuted operations.

4. The method of claim 1, further comprising:
    responsive to all operations in the set of operations completing execution, rejoining a parent thread of the application.

5. The method of claim 1, wherein the set of operations within the block of code of the application that are distinct and process unrelated data are identified within the block of code.

6. A computer program product comprising a computer readable storage medium having a computer readable program stored therein, wherein the computer readable program, when executed on a computing device, causes the computing device to:
    execute a first operation on a first thread in a processor, wherein the first operation is from a set of operations within a block of code of an application that are distinct and process unrelated data;
    determine whether a time limit associated with executing the first operation has been exceeded, wherein the time limit is a default time limit that triggers parallelization of operations within the block of code of the application that are distinct and process unrelated data when the default time limit has been exceeded and wherein the default time limit is used when a predetermined time limit fails to be identified within the block of code of the application;
    responsive to the time limit being exceeded, determine whether there is one or more unexecuted operations in the set of operations; and responsive to one or more unexecuted operations existing in the set of operations, spawn off a new thread on the processor to execute a next unexecuted operation of the one or more unexecuted operations.

7. The computer program product of claim 6, wherein the computer readable program further causes the computing device to:
responsive to the time limit failing to be exceeded, determine whether the first operation has completed;
responsive to the first operation completing before the time limit is exceeded, determine whether there is one or more unexecuted operations in the set of operations; and
responsive to one or more unexecuted operations existing in the set of operations, execute the next unexecuted operation of the one or more unexecuted operations.

8. The computer program product of claim 6, wherein the computer readable program further causes the computing device to:
for each unexecuted operation in the one or more unexecuted operations spawned off to a new associated thread due to a previous operation exceeding the time limit:
execute the unexecuted operation on the new associated thread in the processor thereby forming a executing operation;
determine whether a time limit associated with the executing operation has been exceeded;
responsive to the time limit being exceeded, determine whether there is one or more unexecuted operations in the set of operations; and
responsive to one or more unexecuted operations existing in the set of operations, spawn off an associated thread on the processor to execute the next unexecuted operation of the one or more unexecuted operations.

9. The computer program product of claim 6, wherein the computer readable program further causes the computing device to:
responsive to all operations in the set of operations completing execution, rejoin a parent thread of the application.

10. The computer program product of claim 6, wherein the set of operations within the block of code of the application that are distinct and process unrelated data are identified within the block of code.

11. An apparatus comprising:
a processor; and
a memory coupled to the processor, wherein the memory comprises instructions which, when executed by the processor, cause the processor to:
execute a first operation on a first thread in the processor, wherein the first operation is from a set of operations within a block of code of an application that are distinct and process unrelated data;
determine whether a time limit associated with executing the first operation has been exceeded, wherein the time limit is a default time limit that triggers parallelization of operations within the block of code of the application that are distinct and process unrelated data when the default time limit has been exceeded and wherein the default time limit is used when a predetermined time limit fails to be identified within the block of code of the application;
responsive to the time limit being exceeded, determine whether there is one or more unexecuted operations in the set of operations; and
responsive to one or more unexecuted operations existing in the set of operations, spawn off a new thread on the processor to execute a next unexecuted operation of the one or more unexecuted operations.

12. The apparatus of claim 11, wherein the instructions further cause the processor to:
responsive to the time limit failing to be exceeded, determine whether the first operation has completed;
responsive to the first operation completing before the time limit is exceeded, determine whether there is one or more unexecuted operations in the set of operations; and
responsive to one or more unexecuted operations existing in the set of operations, execute the next unexecuted operation of the one or more unexecuted operations.

13. The apparatus of claim 11, wherein the instructions further cause the processor to:
for each unexecuted operation in the one or more unexecuted operations spawned off to a new associated thread due to a previous operation exceeding the time limit:
execute the unexecuted operation on the new associated thread in the processor thereby forming a executing operation;
determine whether a time limit associated with the executing operation has been exceeded;
responsive to the time limit being exceeded, determine whether there is one or more unexecuted operations in the set of operations; and
responsive to one or more unexecuted operations existing in the set of operations, spawn off an associated thread on the processor to execute the next unexecuted operation of the one or more unexecuted operations.

14. The apparatus of claim 11, wherein the instructions further cause the processor to:
responsive to all operations in the set of operations completing execution, rejoin a parent thread of the application.

15. The apparatus of claim 11, wherein the set of operations within the block of code of the application that are distinct and process unrelated data are identified within the block of code.

* * * * *